Nov. 16, 1937.  V. E. CARBONARA  2,099,467
ALTIMETER
Filed Nov. 5, 1932   4 Sheets-Sheet 1

INVENTOR.
VICTOR E. CARBONARA.
BY Stephen Cerstvik
ATTORNEY.

Nov. 16, 1937.   V. E. CARBONARA   2,099,467
ALTIMETER
Filed Nov. 5, 1932   4 Sheets-Sheet 2
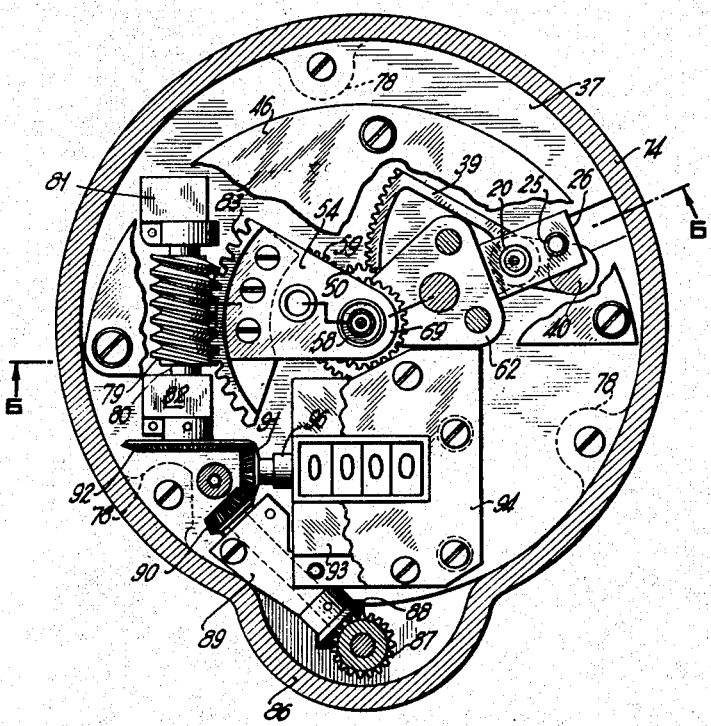
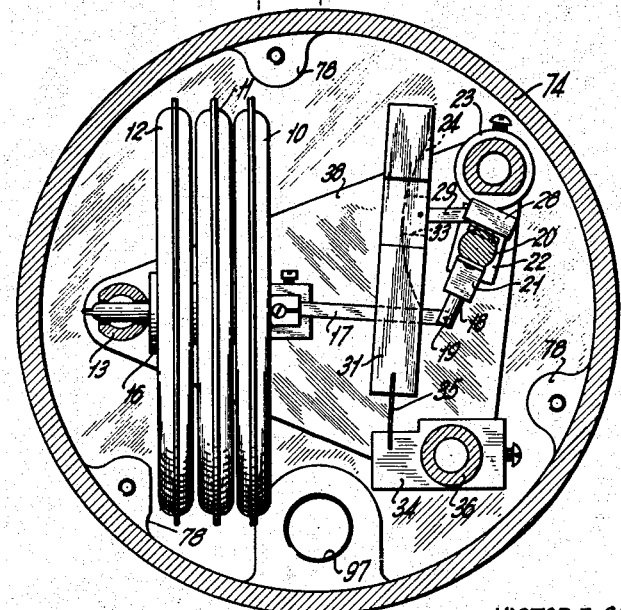
INVENTOR.
VICTOR E. CARBONARA.
BY Stephen Cerstvik.
ATTORNEY Nov. 16, 1937.  V. E. CARBONARA  2,099,467
ALTIMETER
Filed Nov. 5, 1932    4 Sheets-Sheet 3
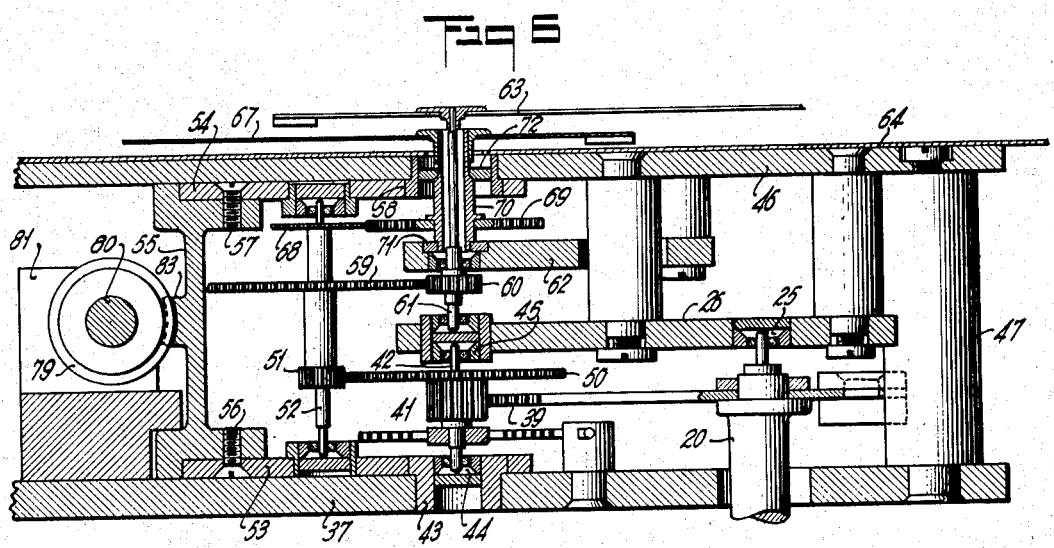
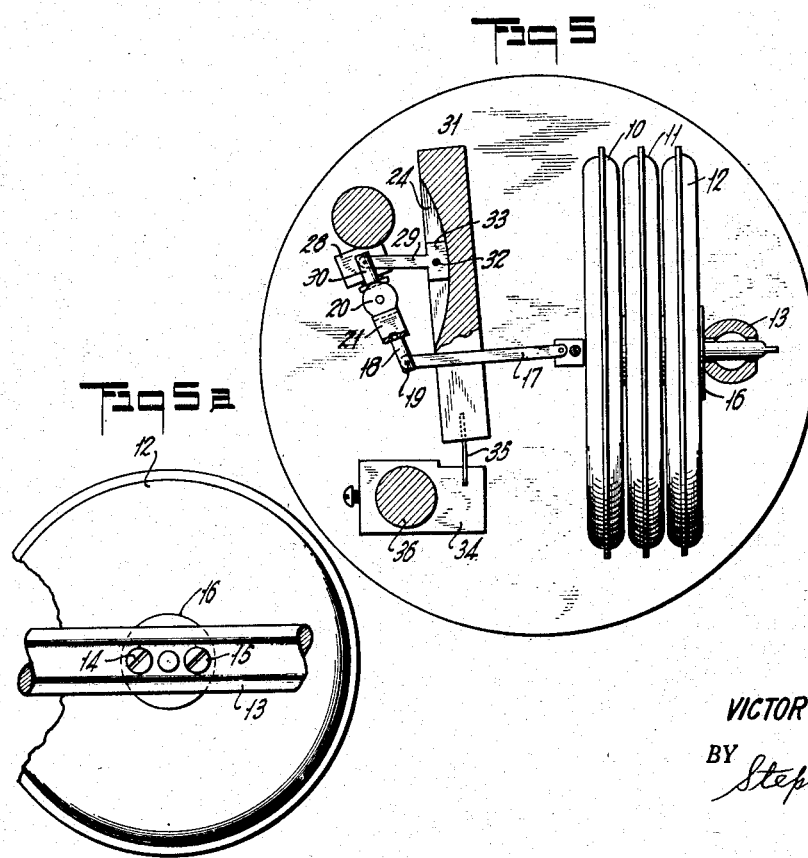
INVENTOR.
VICTOR E. CARBONARA.
BY Stephen Cerstvik
ATTORNEY Nov. 16, 1937.  V. E. CARBONARA  2,099,467
ALTIMETER
Filed Nov. 5, 1932  4 Sheets-Sheet 4
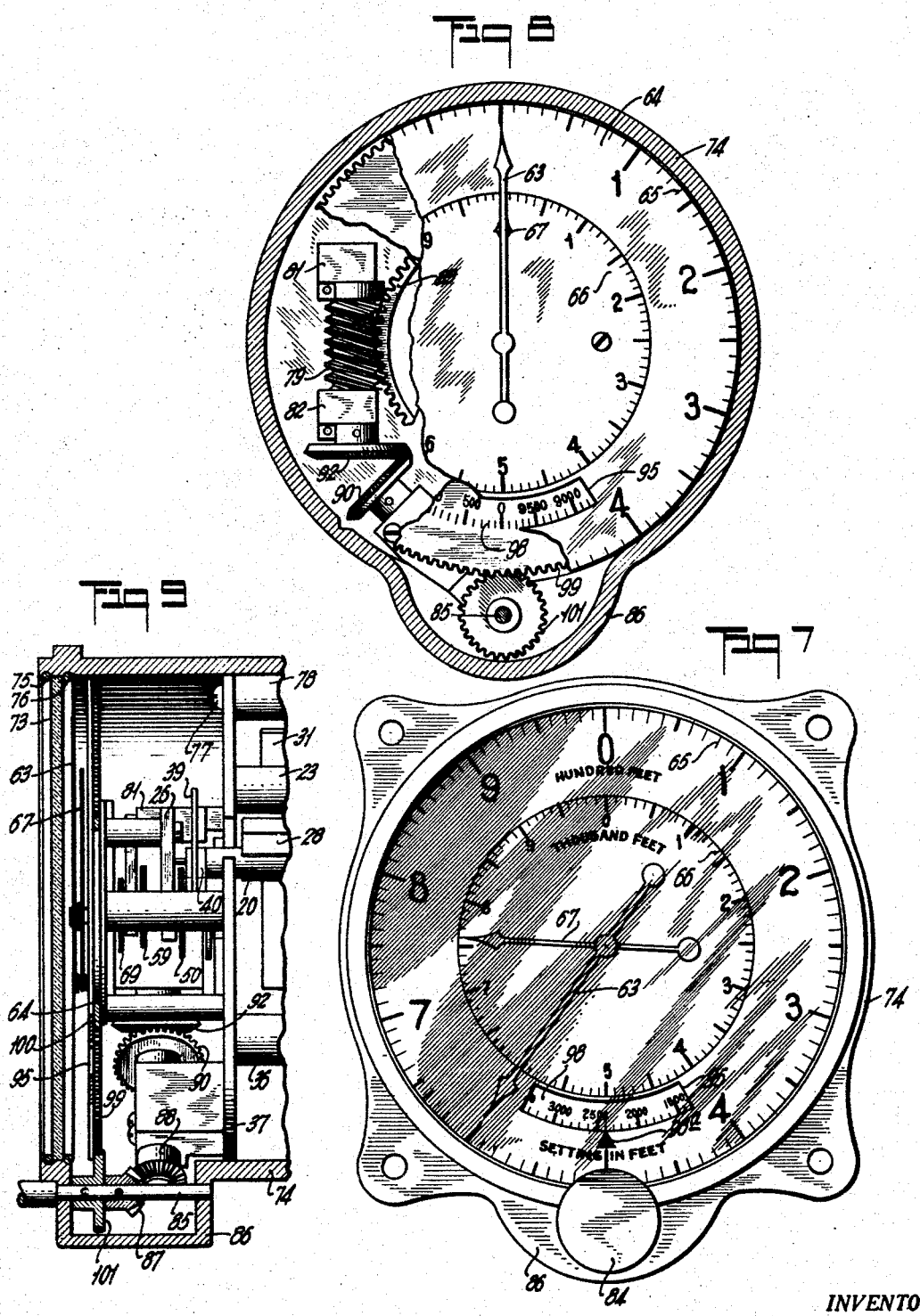
INVENTOR.
VICTOR E. CARBONARA.
BY Stephen Cerstvik.
ATTORNEY.

Patented Nov. 16, 1937

2,099,467

UNITED STATES PATENT OFFICE 2,099,467

ALTIMETER

Victor E. Carbonara, Rockville Centre, N. Y., assignor to Bendix Aviation Corporation, South Bend, Ind., a corporation of Delaware Application November 5, 1932, Serial No. 641,446

6 Claims. (Cl. 73—4)

The present invention relates to indicating instruments such, for example, as sensitive altimeters and constitutes a modification of the invention disclosed in a co-pending application Serial No. 616,322 filed June 9, 1932.

As pointed out in the above-mentioned copending application, in indicating instruments of certain types, such as altimeters, it is desirable that they be capable of adjustment under one condition for a second and predetermined condition and that they indicate when said predetermined condition occurs or is reached and also indicate the predetermined condition for which the instrument is adjusted.

In altimeters, for example, and particularly in sensitive altimeters embodying a plurality of scales and cooperating pointers for indicating altitude in hundreds and thousands of feet, this adjusting feature may be embodied therein in such a manner that the altimeter may be preset at one airport having one pressure-level altitude with respect to sea-level for a pressure-level altitude of another airport to and at which it is desired to fly and land, so that when the aircraft on which the altimeter is carried lands at the second airport the altimeter will indicate zero altitude, thereby providing a pilot with correct indications of the altitude of his craft with respect to the ground at the airport at which he is going to land. Simultaneously operable with this adjusting mechanism may be embodied a reference means separate from the pointer scales for indicating, as a positive quantity, the predetermined altitude for which the altimeter has been adjusted.

For purposes of illustration, assume that a pilot is going to fly from airport No. 1, the pressure altitude of which is 500 feet above sea-level, to airport No. 2, the altitude of which is 1,000 feet above sea-level. If the altimeter is not provided with adjusting means (except for adjusting to indicate zero at the particular altitude at which the craft is at the time) then when the pilot takes off from airport No. 1 and levels off to the flying altitude of 2,000 feet (2,500 feet above sea-level), upon reaching a position over airport No. 2 his altimeter will still indicate 2,000 feet, whereas his altitude above airport No. 2 is only 1,500 feet. Thus, he would be led to believe he is higher than he actually is, and this would cause him to mis-judge his landing in view of the fact that he would be on the ground when his altimeter would still indicate 500 feet altitude. Therefore, an adjustment must be provided in the altimeter whereby the latter can be set at airport No. 1 for the altitude of airport No. 2, and to indicate such altitude on the instrument as a positive quantity on a reference indicating means separate from the pointer scales of the instrument, simultaneously causing relative movement between the pointers and their respective scales, so that when the aircraft reaches a position over airport No. 2, the altimeter will indicate the true altitude above the airport and will show zero when the plane reaches the ground.

Although, as indicated above, the invention finds its maximum utility when applied to altimeters, and more particularly to sensitive altimeters having a plurality of pointers and scales, it is to be expressly understood that it may be readily and advantageously embodied in other types of instruments such, for example, as aneroid thermometers, barometers, pressure gauges, flow meters, stress indicators, hygrostats, barographs, and in fact in any other type of indicating instrument which is adapted to indicate changes in conditions.

Heretofore, various mechanisms have been provided for making an adjustment as described above, in which the complete indicating unit, including the amplification mechanism and the pressure-sensitive element, was rotatable with respect to its casing, and the pointers, scales and reference marks were rotatable with respect to each other and/or to the indicating unit, the reference marks cooperating with the pointer scales to indicate the predetermined condition for which the instrument was adjusted. Such arrangements required complicated gear trains to cause relative movement between the pointers, the scales and the reference marks and were likely to cause confusion in readings because the reference marks indicated one thing on the scales while the pointers indicated another. Accordingly, one of the objects of the present invention is to provide a novel altimeter embodying novel adjusting and reference indicating means whereby the foregoing difficulties are eliminated and the set condition or altitude clearly indicated separately from the scales with which the pointers cooperate.

Another object of the invention is to provide in an indicating instrument, novel means whereby the instrument may be set for a predetermined condition and to indicate such condition upon its being reached, and also to indicate the predetermined condition at the time that the instrument is set and until a new setting is made.

Another object is to provide, in a sensitive altimeter, novel means whereby relative movement is produced between the scales and pointers without moving the pressure-sensitive element and/or its amplification mechanism for adjusting the altimeter so that it will produce a desired indication when a predetermined altitude is reached, and including means for indicating such predetermined altitude separately from the pointer scales when the setting is made.

A further object of the invention is to provide a novel sensitive altimeter embodying a plurality of scales and pointers relatively movable with respect to each other for indicating action and for setting to a predetermined condition so that a desired reading may be obtained from the scales when the predetermined condition is reached, and means separate from the scale and pointers but cooperating therewith during adjustment for and/or indicating action indicating the condition for which the altimeter is set.

Still another object is to provide a novel instrument of the class described, which is relatively simple in construction but yet extremely sensitive and of high efficiency and perfect operation and embodying relatively few parts whereby the instrument may be manufactured economically on a production basis.

The above and other objects and advantages of the invention will appear more fully hereinafter from a consideration of the detailed description which follows when taken together with the accompanying drawings wherein one embodiment of the invention is illustrated. It is to be expressly understood, however, that the drawings are for the purpose of illustration and description only and are not designed as a definition of the limits of the invention, reference being had for this purpose to the appended claims.

In the drawings wherein like reference characters refer to like parts throughout the several views, Fig. 1 is a front view of one form of instrument embodying the present invention;

Fig. 3 is a sectional view taken on line 3—3 of Fig. 2;

Fig. 4 is a sectional view taken on the line 4—4 of Fig. 2;

Fig. 5 is another sectional view taken on the line 5—5 of Fig. 2;

Fig. 5a is a detail view, partly broken away, of the mounting for the pressure-sensitive element;

Fig. 6 is an enlarged detailed sectional view taken on the line 6—6 of Fig. 4;

Fig. 7 is a front view of another embodiment of an instrument to which the present invention has been applied;

Fig. 8 is a sectional view of the instrument shown in Fig. 7 and is similar to the sectional view shown in Fig. 4; and Fig. 9 is a partial longitudinal sectional view of the casing showing the adjusting mechanism of the instrument shown in Fig. 7.

Figure 1:
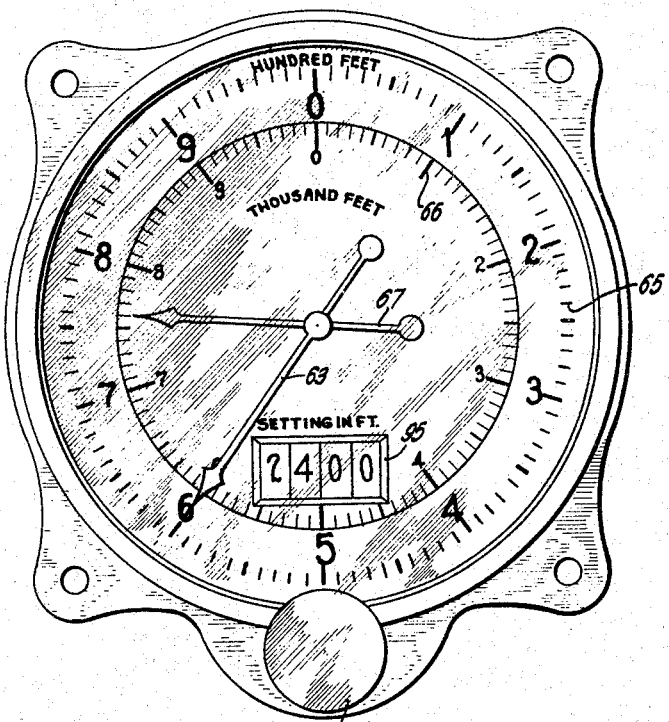
Figure 2:
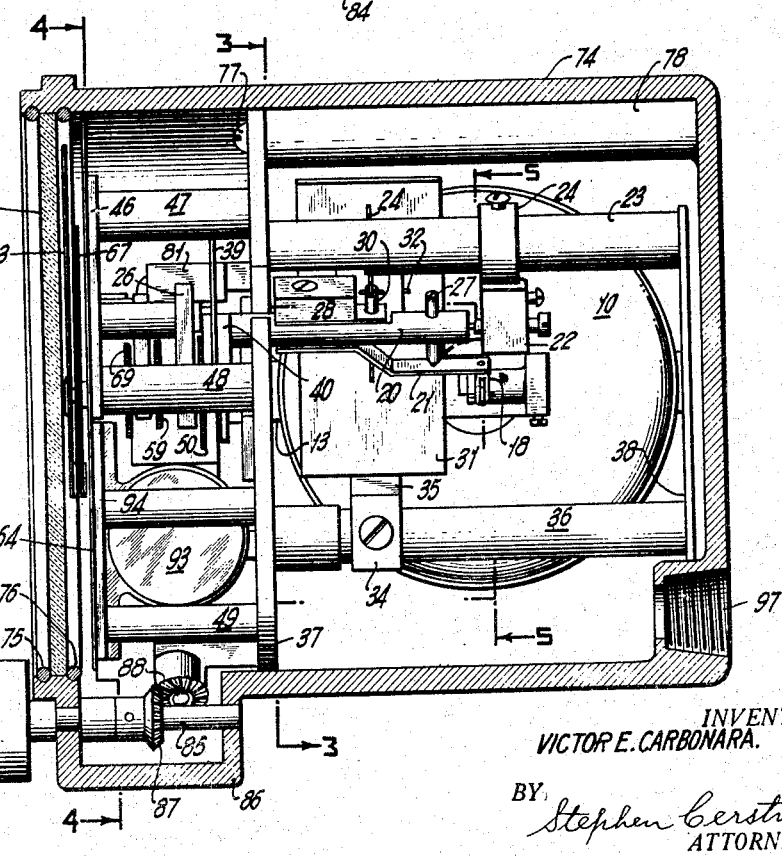
Fig. 2 is a longitudinal sectional view of the instrument casing showing the functional relationship of the various elements of the device shown in Fig. 1.

Referring to the drawings, and more particularly to Figs. 2 to 6, inclusive, the instrument embodying the present invention is shown in the form of an altimeter having an evacuated pressure-sensitive element which is adapted to expand and contract upon variations of pressure due to changes in altitude, and amplification mechanism for amplifying the relatively small movements of the pressure-sensitive element into readily discernible movements of a plurality of pointers over cooperating scales to indicate the altitude in feet or meters or in terms of barometric pressure if desired, the pointers being geared together in such a manner that one moves only a fraction of a revolution for one complete revolution of the other, the latter indicating the altitude in hundreds of feet and the former in thousands of feet or in units having the same or different ratio.

In the form shown, the pressure-sensitive element comprises one or more aneroid capsules such as, for example, 10, 11 and 12 carried by a supporting member in the form of a transversely extending rod 13, said capsules being secured to the rod in any suitable manner as, for example, by means of screws 14 and 15 which extend through the rod and engage a collar 16 on the capsule 12 (Fig. 5a). Means are provided for employing and amplifying the movements of the aneroid capsules upon actuation thereof due to changes in pressure, to produce indications which, as stated hereinbefore, may be in terms of barometric pressure or of altitude in feet or meters. In the form shown, said means comprise a pair of links 17 and 18 pivotally connected together at 19, the link 17 being in turn pivotally connected to the aneroid capsule 10 and the link 18 being rigidly secured to a rock-shaft 20 by means of a bracket 21 for causing a rocking movement of the shaft upon actuation of the aneroid capsules 10, 11 and 12. The rock-shaft is journaled at one end by means of a jeweled bearing carried by an adjustable support 22 (Fig. 2) which in turn is carried by and secured to a spacing rod 23 by means of an adjustable collar 24. The shaft is journaled at its other end by means of a jeweled bearing 25 carried by a fixed plate 26 (Fig. 6). A calibrating screw 27 is carried by and extends through the rock-shaft 20 so that one end of said screw engages the spring bracket 21. A counterweight 28 is provided on the rock-shaft to counter-balance the bracket 21 and the links 17 and 18. The rock-shaft is also pivotally connected to a link 29 by means of a post 30 rigidly secured to the rock-shaft on the opposite side of the bracket 21, and the link 29 is in turn pivotally connected to a counterweight 31 by means of a pin 32 which extends transversely through the counterweight and through an enlarged portion 33 of the pivot 29, which fits into a slot 24. The counterweight is resiliently supported on a block 34 by means of a leaf spring 35, the block 34 being in turn adjustably mounted on a spacing rod 36. The purpose of the counterweight 31 and its connection to the rock-shaft 20 by means of the link 29 is to provide a complete balance of the elastic system in order to prevent movement thereof due to vibration, acceleration force, etc. In other words, the rock-shaft 20 is actuated only by the capsules 10, 11 and 12 and not by any undesirable and/or extraneous forces. The spacing rods 13, 23 and 36 are secured at their opposite ends to plates 37 and 38 (Fig. 2) and together with the latter form a supporting structure for carrying the complete mechanism of the instrument.

The rock-shaft 20 has secured thereto a gear sector 39 provided with a counterweight 40 (Figs. 2, 4 and 6), said sector being arranged to mesh with a pinion 41 carried by a counter-shaft 42 journaled at one end in a bushing 43 carried by the plate 37 by means of a jewel bearing 44, and at its other end in a jewel bearing 45 carried by the plate 26. Parallel to the plate 26 and spaced therefrom is a dial plate 46 which is secured to the plate 37 by means of spacing rods 47, 48 and 49, said dial plate thereby providing a fixed support for the pointer mechanism and other members, which will be described hereinafter. Secured to the shaft 42 is a relatively large gear 50 which meshes with a pinion 51 carried by a shaft 52 journaled in a pair of angularly movable plates 53 and 54, which are secured to an arcuate member 55 in any suitable manner, as by means of screws 56 and 57, said member 55 extending transversely of and being interposed between the plates 53 and 54. The plates 53 and 54 are journaled on bushings 43 and 58, respectively, the bushing 58 being carried by the dial plate 46 so that said plates may be moved angularly on their bushings for a purpose which will appear hereinafter. On the shaft 52 is another relatively large gear 59 which meshes with a pinion 60 carried by a shaft 61 journaled in the plate 26 and in another plate 62, said shaft 61 constituting a pointer shaft on which is carried a large pointer 63 which traverses a dial 64 secured to the plate 46 and upon which is engraved or etched a scale 65 (Fig. 1) marked in hundreds of feet for example. Concentric with the scale 65 is another scale 66 which is graduated in thousands of feet and has cooperating therewith a small pointer 67.

In order that the pointer 67 shall move with respect to its scale 66 in the ratio existing between the scales 65 and 66, the pointers are geared together in such a manner that the pointer 67 moves only a fraction of a revolution for one complete revolution of the large pointer 63 and, for this purpose, another pinion 68 is provided on the shaft 52 and arranged to mesh with a larger gear 69 which is secured to a hollow shaft 70 journaled in bearings 71 and 72 and through which the pointer shaft 61 of the large pointer 63 extends and on which is carried the small pointer 67.

A cover-glass 73 of some suitable transparent material, which may be other than glass, is secured to the open end of an instrument casing 74 in any suitable manner as by means of split clamping rings 75 and 76, so that the pointers 63 and 67 may be viewed therethrough in their cooperation with the scales 65 and 66. The entire mechanism is fastened within the casing by means of screws 77 which extend through the plate 37 and into a plurality of circumferentially spaced bosses 78 formed integrally with and on the interior of the casing 74.

It will be apparent from the foregoing that as the aneroid capsules 10, 11, 12 are actuated by barometric pressure, the rock-shaft 20 is actuated through the links 17 and 18 to cause movement of the gear sector 39 thereby operating the pointers 63 and 67 in the proper ratio through the gear trains 41, 50, 51, 59, 60, and 68, 69, respectively. It will also be apparent that the pointers 63 and 67 will indicate the altitude with respect to barometric pressure or sea-level and not the true altitude with respect to the ground; i. e., the pointers would indicate zero only when the instrument is at sea-level under normal conditions and, therefore, it is desirable that the instrument be capable of adjustment to indicate zero when the instrument is on the ground regardless of the altitude of the ground with respect to sea-level. It is further desirable that the instrument be capable of being set under one condition for a second condition and to indicate when the second condition occurs or is reached. To this end novel means are provided for making such adjustment and, in the form shown, comprise means for causing relative movement between the pointers and their respective scales in their proper ratio so that the pointers will indicate zero when the instrument reaches the altitude for which it was set. In the present instance, said means are constituted by the same gear train as is employed for actuating the pointers by the operation of the rock-shaft 20 upon expansion and contraction of the pressure-sensitive element, except that means are provided for producing a planetary action within said gear train, for which purpose the plates 53 and 54, in which the shaft 52 is journaled, are made angularly adjustable about the common axis of the pointers while the aneroid capsules remain bodily stationary with and on their support. Means are, therefore, provided for causing the angular movement of the plates 53 and 54 and, in the form shown, said means comprise a worm 79 secured to or formed integral with a shaft 80, journaled in a pair of blocks 81 and 82 carried by the plate 37, said worm meshing with a gear 83 provided on the periphery of the arcuate member 55. The worm 79 is adapted to be actuated from the front of the instrument by means of a knob 84 secured to a shaft 85 journaled in an auxiliary compartment 86 formed with the main casing 74. On the shaft 85 there is a bevel pinion 87 which meshes with and drives a bevel gear 88 carried by a shaft 89, and on the other end of the shaft 89 is another bevel pinion 90 which drives a bevel gear 91, the latter in turn driving a bevel gear 92 carried by the worm shaft 80.

It will be apparent from the foregoing that upon rotation of the worm 79 by means of the knob 84 through the bevel gears 87, 88, 90, 91 and 92, the gear 83 and hence the members 53 and 54 will be caused to rotate on the bushings 43 and 58 thereby carrying along therewith the shaft 52 which is journaled in said members or plates 53 and 54. Therefore, as the shaft 52 revolves about the center of the bushings as an axis, the pinion 51 will be driven by the gear 50 since the latter is relatively stationary, and rotation of the pinion 51 thereby drives the pointers 63 and 67 through the gear trains 59, 60 and 68, 69 in the same ratio as when said pointers are actuated through the same gear train by the gear sector 39 and pinion 41. It will be apparent, however, that the pointers may be operated by the pressure-responsive element while and during the time that a setting is being made, by virtue of the fact that rotation of the pinion 51 may be a resultant rotation produced by angularly moving the shaft 52 about the gear 50 through the operation of the worm 79 by means of the knob 84 and that produced by the gear 50 driving the pinion 51 due to the operation of the gear sector 39 by the pressure-sensitive element. Hence the setting may be made while the instrument is indicating. Relative movement may be caused between the pointers and their respective scales to any degree which may be desired by manipulating the knob 84 so that said pointers will produce a desired indication on the scales, as, for example, a zero reading when the desired condition or pressure level altitude for which the instrument is set has been reached.

It is also desirable that the condition for which the instrument is to be set may be indicated at the time the setting is being made and that such indication remain unchanged so that it may be employed as a reference point, in other words, if it is desired to set the pointers so that they will indicate zero when a certain altitude is reached, it is essential that such condition be indicated at the time the setting is made. To this end, means are provided whereby the indication of the desired condition for which the instrument is set is produced simultaneously with the actuation of the worm 79 and worm gear 83 to cause relative movement between the pointers and the scales. In the form shown, said means comprise a counter 93 carried by a fixed auxiliary plate 94 and arranged so that the number carrying dials thereof are visible through an opening 95 (Fig. 1), provided in the dial 64 at any convenient point as, for example, at the lower portion of the scale 66.

The number carrying dials of the counter, which in the present instance are marked in feet, are actuated simultaneously with the setting of the pointers by means of the knob 84 through a shaft 96 which carries the bevel pinion 91, the former, as pointed out hereinbefore, being adapted to be driven by the pinion 91 and to drive the gear 92. The first two number-carrying dials from the right of the counter 93, as viewed in Fig. 1, i. e., the "units" and "tens" dials, are locked together for simultaneous rotation and the "units" dial has all zeros marked on it when the counter is calibrated to indicate the preset altitude in feet, it being sufficient to indicate the altitude within ten feet. Thus, the two right-end dials make ten revolutions while the "hundreds" dial makes one revolution and the "thousands" dial makes one-tenth of a revolution. Or, if accuracy is desired within only one hundred feet, the two right-end dials may be permanently fixed and only the "hundreds" and "thousands" dials made rotatable.

It will be apparent from the foregoing that when the knob 84 is actuated to adjust the instrument for a desired condition, relative movement is caused between the pointers and their respective dials through their respective gear trains by the actuation of the worm 79, and simultaneously with the movement of the pointers the shaft 96 is also actuated thereby rotating the number carrying dials of the counter to indicate the condition for which the instrument has been set. Thereafter, the pointers are operated independently of the counter through their respective gear trains by means of the rock-shaft 20 to produce the required indication on the scales 65 and 66 when the condition occurs or has been reached for which the instrument has been set, and which condition is indicated on the counter.

Assume, for example, that the instrument is at sea-level under normal barometric pressure, at which time the pointers 63 and 67 indicate zero on their respective scales 65 and 66, and the number carrying dials of the counter also indicate zero (Fig. 4). If the pilot of a craft on which the instrument is mounted now desires to fly to a landing field which has a pressure-level altitude of 2400 feet, he rotates the knob 84 until 2400 feet is indicated on the counter (Fig. 1), at which time relative movement is also caused between the pointers 63 and 67 and their respective dials, so that they no longer indicate zero on their scales (Fig. 1) but have been moved counter-clockwise from the zero mark by an amount on their scales which is necessary for the pointers to traverse for a change of 2400 feet in altitude. The relative position of the pointers with respect to their scales is now such that they indicate 2400 feet away from zero but will indicate zero when the pilot reaches the field for which he is flying and for which the instrument has been adjusted. The setting of the counter, however, remains unchanged during the indicating action of the pointers and until the instrument is again adjusted by means of the knob 84.

In order to place the interior of the instrument casing 74 in communication with the true static pressure of the atmosphere, the casing is provided with a threaded opening 97 to which may be connected a pipe leading to the static head of a Pitot tube (not shown) secured to a wing of the craft.

Referring now to Figs. 7, 8 and 9, there is shown another embodiment of the invention wherein the counter is replaced by a rotatable scale 98 which is adapted for simultaneous actuation by the knob 84 when the adjustment is made between the pointers and scales, and, for this purpose, the dial 98 is carried by a large gear 99 journaled on a fixed ring 100 and meshing with a pinion 101 carried by the shaft 85 which also carries the bevel pinion 87 for driving the worm 79. The scale 98 is positioned in back of the dial 64 and visible through a window provided in the dial in the same manner as in the embodiment shown in Figs. 1 to 6, inclusive, said scale cooperating with a fixed reference index 98a provided on the front of the dial 64.

There is thus provided a novel indicating instrument which may be set under one condition for a second condition so that it will indicate when the second condition occurs or is reached, and which also indicates, on a reference scale separate from the pointer scale, the condition for which it has been set independently of the indicating action of the instrument, and capable of being set while the instrument is indicating and, as pointed out hereinbefore, the invention is particularly suitable for use in a sensitive altimeter whereby a pilot can set his instrument at a flying field having one pressure-level altitude, so that it will indicate zero when he reaches a second flying field whose pressure-level altitude is different from that of the first flying field, and which altitude can be set into the instrument as a positive indication.

Although only two embodiments of the invention have been illustrated and described, other changes and modifications, which will now appear to those skilled in the art, may be made without departing from the scope of the invention. It is also obvious that the counter 93 or the reference scale 98 and the pointer scales 65 and 66 may be calibrated in terms of barometric pressure as well as in feet or meters or in any other units depending upon the nature of the operating function of the instrument, i. e., in instruments wherein the pressure-sensitive element described above is replaced by a device responsive to changes in conditions other than barometric pressure. Reference is, therefore, to be had to the appended claims for a definition of the limits of the invention.

What is claimed is:

1. An indicating instrument comprising a device responsive to changes in conditions to be indicated, means supporting said device, actuator means including a member rotatably associated with said supporting means, a shaft operated by said change responsive device and journaled in said rotatable member and being revolvable therewith about the axis of said member while said change responsive device remains bodily stationary and in addition to being rotatable on its own axis relative to said member, indicating means rotatably carried by the supporting means and operatively connected by the shaft to the change responsive device, and means including a worm gear on said rotatable member, a worm, and a knob adapted to be operated from the exterior of the instrument for actuating the worm and worm gear to cause relative movement between said device and said rotatable member for operating the indicating means by said shaft to set the instrument for a predetermined condition.

2. An indicating instrument comprising a device responsive to changes in conditions to be indicated, means supporting said device, actuator means including a member rotatably associated with said supporting means, a shaft operated by said change responsive device and journaled in said rotatable member and being revolvable therewith about the axis of said member while said change responsive device remains bodily stationary and in addition to being rotatable on its own axis relative to said member, indicating means rotatably carried by the supporting means and operatively connected by the shaft to the change responsive device, means including a worm gear on said rotatable member, a worm, and a knob adapted to be operated from the exterior of the instrument for actuating the worm and worm gear to cause relative movement between said device and said rotatable member for operating the indicating means by said shaft to set the instrument for a predetermined condition, and reference indicating means separate from but operable with the first indicating means during setting for indicating the predetermined condition for which the instrument has been set.

3. An indicating instrument comprising a device responsive to changes in conditions to be indicated, a fixed support for said device, actuator means including a pair of plates having an arcuate bridging member therebetween spacing them apart, said plates being rotatably mounted on said fixed support, a shaft operated by said change responsive device and journaled in and between said plates and being revolvable therewith about the common axis thereof in addition to being rotatable on its own axis relative to said plates, a pair of pointers rotatably carried by said fixed support and operatively connected by said shaft to the change responsive device for actuation thereby in a predetermined ratio, dial means for said pointers and having scales calibrated in the ratio of the pointers, and means including a worm gear on the arcuate bridging member of the plates, a worm, and a knob adapted to be operated from the exterior of the instrument for actuating the worm and worm gear to cause angular movement of said plates thereby revolving the shaft about the axis of said plates and causing it to rotate on its own axis for operating the pointers to set the instrument for a predetermined condition whereby said pointers indicate zero on the scales when the predetermined condition occurs or is reached.

4. An indicating instrument comprising a device responsive to changes in conditions to be indicated, a fixed support for said device, actuator means including a pair of plates having an arcuate bridging member therebetween spacing them apart, said plates being rotatably mounted on said fixed support, a shaft operated by said change responsive device and journaled in and between said plates and being revolvable therewith about the common axis thereof in addition to being rotatable on its own axis relative to said plates, a pair of pointers rotatably carried by said fixed support and operatively connected by said shaft to the change responsive device for actuation thereby in a predetermined ratio, dial means for said pointers and having scales calibrated in the ratio of the pointers, means including a worm gear on the arcuate bridging member of the plates, a worm, and a knob adapted to be operated from the exterior of the instrument for actuating the worm and worm gear to cause angular movement of said plates thereby revolving the shaft about the axis of said plates and causing it to rotate on its own axis for operating the pointers to set the instrument for a predetermined condition whereby said pointers indicate zero on the scales when the predetermined condition occurs or is reached, and a reference indicating device behind the dial means and viewable through an opening in the latter, said reference indicating means being operable with the pointers during setting of the instrument and inoperable during operation of the pointers by the change responsive device for indicating the predetermined condition for which the instrument has been set.

5. An altimeter comprising a pressure-responsive device responsive to changes in altitude, a fixed support for said pressure-responsive device, actuator means including a pair of plates having an arcuate bridging member therebetween spacing them apart, said plates being rotatably mounted on said fixed support, a shaft operated by said pressure-responsive device and journaled in and between said plates and being revolvable therewith about the common axis thereof in addition to being rotatable on its own axis relative to said plates, a pair of pointers rotatably carried by said fixed support and operatively connected by said shaft to the pressure-responsive device for actuation thereby in a predetermined ratio, dial means for said pointers and having scales calibrated in the ratio of the pointers, and means including a worm gear on the arcuate bridging member of the plates, a worm, and a knob adapted to be operated from the exterior of the altimeter for actuating the worm and worm gear to cause angular movement of said plates thereby revolving the shaft about the axis of said plates for operating the pointers to set the altimeter for a predetermined altitude or barometric pressure whereby said pointers indicate zero on the scales when the predetermined altitude is reached or the barometric pressure occurs.

6. An altimeter comprising a pressure-responsive device responsive to changes in altitude, a fixed support for said pressure-responsive device, actuator means including a pair of plates having an arcuate bridging member therebetween spacing them apart, said plates being rotatatively mounted on said fixed support, a shaft operated by said pressure-responsive device and journaled in and between said plates and being revolvable therewith about the common axis thereof in addition to being rotatable on its own axis relative to said plates, a pair of pointers rotatably carried by said fixed support and operatively connected by said shaft to the pressure-responsive device for actuation thereby in a predetermined ratio, dial means for said pointers and having scales calibrated in the ratio of the pointers, means including a worm gear on the arcuate bridging member of the plates, a worm, and a knob adapted to be operated from the exterior of the altimeter for actuating the worm and worm gear to cause angular movement of said plates thereby revolving the shaft about the axis of said plates for operating the pointers to set the altimeter for a predetermined altitude or barometric pressure whereby said pointers indicate zero on the scales when the predetermined altitude is reached or the barometric pressure occurs, and a reference indicating device behind the dial means and viewable through an opening in the latter, said reference indicating means being operable with the pointers during setting of the altimeter and inoperable during operation of the pointers by the pressure-responsive device for indicating the predetermined altitude or barometric pressure for which the altimeter has been set.

VICTOR E. CARBONARA.